Jan. 18, 1949.  H. C. FLINT  2,459,756
BED STRUCTURE
Filed July 5, 1946
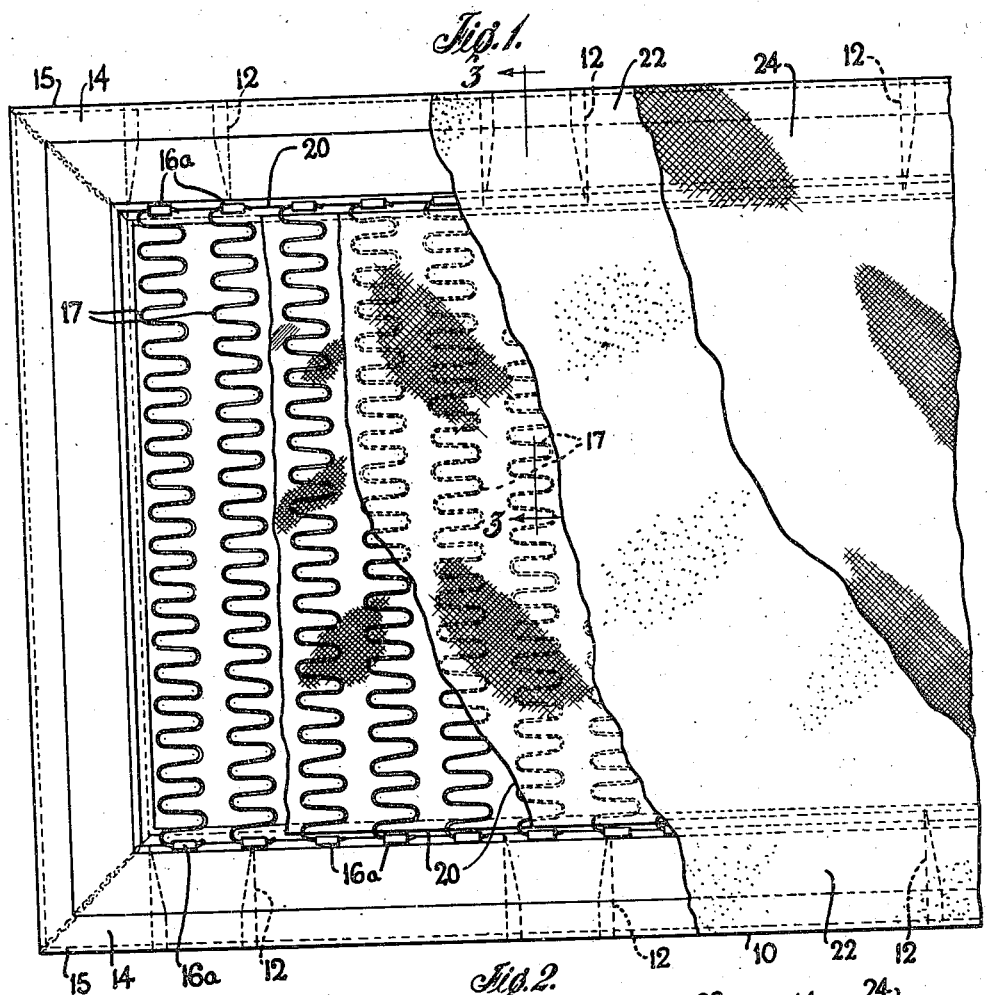
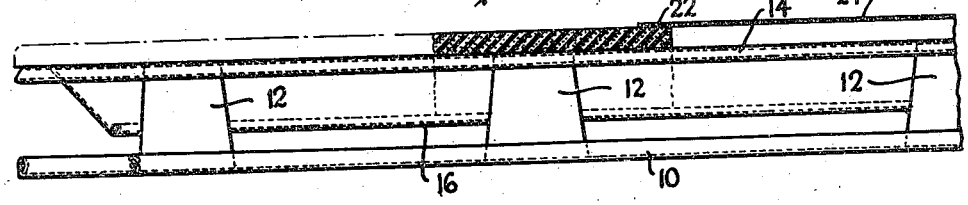
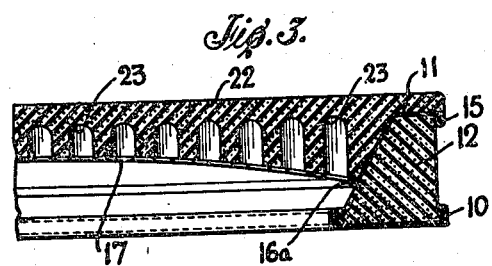
INVENTOR
HYLAND C. FLINT
BY
ATTORNEYS Patented Jan. 18, 1949

2,459,756

UNITED STATES PATENT OFFICE 2,459,756

BED STRUCTURE

Hyland C. Flint, Akron, Ohio, assignor to The Firestone Tire & Rubber Company, Akron, Ohio, a corporation of Ohio Application July 5, 1946, Serial No. 681,554

6 Claims. (Cl. 5—351)

This invention relates to bed structures, and more especially it relates to bed structures that constitute combination spring and mattress elements.

The invention is of primary utility in its application to the beds on high speed vehicles such as Pullman coaches, especially when the beds are arranged transversely of the car. Conventional type mattresses used on beds of the character mentioned usually comprise coil springs or foam rubber composition to provide the necessary resilience. In such mattresses the top surface and the bottom surface are directly connected to the inner mass thereof, and since the latter must be substantially resistant to displacement, said top and bottom surfaces are substantially immovable relatively to each other laterally, that is, in the direction parallel to the plane of the mattress. Thus any side-to-side snap of a fast moving vehicle is transmitted to the bottom surface of the mattress, and from there to the inner mass, and to a very substantial degree to the top surface and to the occupant of the bed reclining thereon. Thus the occupant is subjected to an unpleasant jerking action which at high speed becomes practically continuous.

The chief objects of the invention are to provide an improved bed structure for high speed vehicles capable of damping out a substantial degree of lateral whip translated thereto by movement of the vehicle; to provide a structure of the character mentioned that will not occupy any greater volume of space than conventional bed structures of similar type heretofore in use; and in general to contribute to the comfort of passengers who may from time to time occupy the bed. Other objects will be manifest as the description proceeds.

Of the accompanying drawing,

Fig. 1 is a plan view of a bed structure embodying the invention, a part thereof being broken away to reveal underlying structure;

Fig. 2 is a side elevation thereof; and

Fig. 3 is a section on line 3—3 thereof.

Referring to the drawing, there is shown a bed structure comprising an open base frame 10 that is rectangular in shape, and consists of four upwardly open channel shaped sheet metal members that constitute the two ends and two sides of the frame, said members being welded together at the four corners of the frame. Mounted in the two channels that constitute the two sides of the frame 10 are respective series of resilient pillars 12, 12, which pillars preferably are composed of cellular or foam rubber. Each of the pillars 12 has the shape of a truncated pyramid, its top and bottom faces being parallel, its outwardly presented lateral face being perpendicular to said top and bottom faces, and its other lateral faces being sloped and tapered toward said top face. The pillars 12 are adhered to the base frame 10 by being cemented thereto.

Supported upon the pillars 12 is an open, rectangular floating frame 14 composed of four sheet metal members that are welded to each other at the four corners of the frame. In section, each member of the floating frame 14 has the shape of member of the floating frame 14 has the shape of an obtuse angle, one leg of which is in a horizontal plane and has a downwardly turned integral flange 15 on its outer margin, the other leg thereof extending downwardly and inwardly therefrom. The angle members at opposite sides of the frame 14 have their horizontal portions resting upon the pillars 12, to which they are attached by being cemented thereto, the flanges 15 being disposed against the vertical faces of the pillars. The downwardly and inwardly extending portions of the angular frame members at opposite sides of the frame rest flush against the sloped, inwardly presented faces of the pillars 12 and are not attached thereto. The downwardly and inwardly extending portion of the members of floating frame 14 are reinforced by a marginal bead 16, and at opposite sides of the frame the bead 16 is cut away at spaced intervals to provide short tubular sleeves or anchorages 16a, 16a for a plurality of spring units 17, 17 that extend transversely of the floating frame, said sleeves 16 being aligned with each other on opposite sides of the frame.

The spring units 17 are of the type that constitute the subject matter of the Kaden Reissue Patent No. 21,263, granted November 14, 1939. Each of the spring units 17 consists of a transversely flat structure made up of a single spring wire that has been bent into a longitudinal succession of undulations or sinuosities. The spring unit is tempered after it is bent as described, and while rolled into a relatively tight coil, with the result that the unit resists uncoiling, and when uncoiled assumes a longitudinally arcuate shape, as is best shown in Fig. 3. The spring units 17 are all of the same length and strength, and extend from one side of the floating frame 14 to the other, the terminal portion at each end of each spring being swiveled in respective anchoring sleeves 16a at opposite sides of the floating frame. The spring units 17 are mounted in upwardly arched arrangement, that is, with their convex sides uppermost, the arrangement being such that they yieldingly resist deflecting stresses tending to flatten them.

In order to avoid extreme deflection of individual spring units 17 when load is applied to local regions of the bed, means is provided for connecting the spring units to each other. Said means comprises sheets of textile material 20, 20 arranged on the concave side and on the convex side of the series of spring units, said sheets of material being bonded to the wires of the spring units and bonded to each other between said wires. Preferably said bonding is effected by means of rubber composition with which the confronting faces of the sheet material are coated, the rubber being vulcanized after the coated material has been assembled with the spring units. The sheet material distributes the load applied to the spring units, and also prevents lateral movement of the units relatively of each other.

Supported upon the floating frame 14 and spring units 17 thereof is a mattress 22, preferably composed of molded cellular or foam rubber. The top face of the mattress 22 is flat, and its upper margin is coincident with the flanged margin of the floating frame, said mattress overlying the horizontal surface of the latter. The bottom face of the mattress is formed with an arched portion complemented to the arch of the spring units 17 on which it rests, and around said arched region the mattress has oblique or sloped surfaces adapted to rest flush against the downwardly and inwardly sloped surfaces of the floating frame. The arrangement provides an interfitting of mattress and floating frame such as to prevent shifting of the mattress relatively of the floating frame as the result of sway and jerking of the vehicle on which the bed structure is installed. For imparting added resilience to the mattress 22, the concave bottom face thereof is formed with a multiplicity of recesses 23, 23 that extend upwardly into the mattress structure, the closed upper ends of said recesses being a uniform distance from the top face of the mattress. Preferably the mattress 22 is covered with the usual ticking 24, or other suitable material, as shown.

In use, it will be obvious that the resilient pillars 12 will yieldingly resist lateral movement of the floating frame 14 and mattress 22 relatively of the base frame 10. However, when the floating frame is subjected to forces tending to move it longitudinally, the pillars 12 offer much less resistance since there are no pillars at the ends of the floating frame, and those at the sides thereof are bonded to said floating frame only at their top faces, their lateral faces that confront the frame being unconnected therewith so that relative movement therebetween is uninhibited. The amount of relative movement between the base frame and floating frame is regulated by the size, shape, and density of the pillars 12. Also it will be apparent that the mattress has greatest resilience in the medial region thereof, over the spring units 17, and that the marginal portions of the floating frame support the marginal region of the mattress against sagging. The overall height of the bed structure is not over 5 or 6 inches, which makes it especially adaptable for use on vehicles where space usually is at a premium.

The invention adds greatly to the comfort of those who require to travel in the night season, and it achieves the other advantages set out in the foregoing statement of objects.

Modification may be resorted to without departing from the spirit of the invention or the scope thereof as defined by the appended claims.

What is claimed is:

1. In a bed structure of the character described, the combination of an open rectangular base frame, an open rectangular floating frame positioned above the same, a mattress carried upon said floating frame, and series of pillars of resilient composition interposed between the base frame and floating frame on two opposite sides of said frames, said pillars having their top and bottom faces adhered to the floating frame and base frame respectively, each pillar having a lateral face in abutting relation to a depending portion of the floating frame so as to oppose lateral movement of the latter.

2. In a bed structure of the character described, the combination of an open rectangular base frame, an open rectangular floating frame positioned above the same and formed with an obliquely depending inner marginal portion, a mattress carried by said floating frame, and resilient pillars interposed between said frames and bonded to each, each pillar having a sloping lateral face in abutting relation to the obliquely depending portion of the floating frame.

3. A combination as defined in claim 2 whereof the pillars are located only at two opposite sides of the bed structure.

4. In a bed structure of the character described, the combination of a base frame, an open rectangular floating frame, yielding means supporting said floating frame upon said base frame, said floating frame having an obliquely depending inner marginal portion, a plurality of transversely flat, upwardly arched spring units extending transversely of the floating frame and connected at their ends to the lower margin of the obliquely depending portion thereof, and a mattress carried upon said floating frame.

5. In a bed structure of the character described, the combination of a base frame, an open rectangular floating frame positioned above the same, a series of pillars of resilient composition interposed between said frames on two opposite sides thereof, said pillars having their top and bottom faces adhered to the floating frame and base frame respectively, each pillar having a lateral face in abutting relation to a depending portion of the floating frame so as to oppose lateral movement of the latter.

6. In a bed structure of the character described, the combination of a base frame, an open rectangular floating frame positioned above the same, a series of pillars of resilient composition having the shape of truncated pyramids interposed between said frames on two opposite sides thereof, said pillars having their top and bottom faces adhered to the floating frame and base frame respectively, each pillar having a lateral face in abutting relation to a depending portion of the floating frame so as to oppose lateral movement of the latter.

HYLAND C. FLINT.

REFERENCES CITED

The following references are of record in the file of this patent:

UNITED STATES PATENTS

| Number | Name | Date |
|---|---|---|
| 1,811,923 | Flintermann | June 30, 1931 |
| 1,916,056 | Lamplugh | June 27, 1933 |
| 2,225,858 | Church | Dec. 24, 1940 |
| 2,259,534 | Reynolds et al. | Oct. 21, 1941 |
| 2,371,954 | Cunningham | Mar. 20, 1945 |